US010623436B2

(12) United States Patent
Mohan et al.

(10) Patent No.: US 10,623,436 B2
(45) Date of Patent: Apr. 14, 2020

(54) SYSTEM AND METHOD OF ARCHITECTURAL SECURITY AND RESILIENCE FOR MICROGRID SYSTEMS

(71) Applicant: Honeywell International Inc., Morristown, NJ (US)

(72) Inventors: Apurva Mohan, Maple Grove, MN (US); Himanshu Khurana, Plymouth, MN (US); Gregory Brainard, Rio Rancho, NM (US); Scott Fischer, Peoria, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 130 days.

(21) Appl. No.: 14/696,777

(22) Filed: Apr. 27, 2015

(65) Prior Publication Data

US 2017/0063918 A1   Mar. 2, 2017

Related U.S. Application Data

(60) Provisional application No. 61/985,429, filed on Apr. 28, 2014.

(51) Int. Cl.
*G06F 11/00* (2006.01)
*G06F 12/14* (2006.01)
(Continued)

(52) U.S. Cl.
CPC .... *H04L 63/1441* (2013.01); *G05B 19/41855* (2013.01); *H04L 63/02* (2013.01); *Y02P 80/114* (2015.11); *Y02P 90/185* (2015.11)

(58) Field of Classification Search
CPC ............................ H04L 63/1441; H04L 63/02
See application file for complete search history.

(56) References Cited

U.S. PATENT DOCUMENTS

| 7,587,481 B1 * | 9/2009 | Osburn, III | G05B 19/4183 709/223 |
| 9,641,026 B2 * | 5/2017 | Boardman | H02J 13/0079 |

(Continued)

OTHER PUBLICATIONS

Cynthia K. Veitch, Jordan M. Henry, Bryn T. Richardson, Derek H. Hart, Sandia Report, Microgrid Cyber Security Reference Architecture, Jul. 2013, pp. 1-85.*

(Continued)

*Primary Examiner* — Mahfuzur Rahman
*Assistant Examiner* — Darshan I Dhruv
(74) *Attorney, Agent, or Firm* — Alston & Bird LLP (57) ABSTRACT

Devices, methods, systems, and computer-readable for providing a cyber-security architecture for microgrid systems are described herein. One or more embodiments include a system for providing a cyber-security architecture for a microgrid, comprising a supervisory control and data acquisition network device having at least one remote network connection to a non-local network device and allowing communication of data and control instructions between the non-local network device and at least one local device in a microgrid network and a control network for providing control instructions to the local device based on data from the microgrid and a power generation network device, the control network allowing communication of data and control instructions between the power generation network device and the local device in the microgrid network.

18 Claims, 3 Drawing Sheets

(51) Int. Cl.
  *G06F 12/16* (2006.01)
  *G08B 23/00* (2006.01)
  *H04L 29/06* (2006.01)
  *G05B 19/418* (2006.01)

(56) References Cited

U.S. PATENT DOCUMENTS

| | | | | |
|---|---|---|---|---|
| 2003/0204756 A1* | 10/2003 | Ransom | ................ | G01D 4/004 713/300 |
| 2005/0134120 A1* | 6/2005 | Nguyen | ................ | H02J 3/04 307/43 |
| 2008/0052356 A1* | 2/2008 | Johnson | ................ | H04L 67/12 709/204 |
| 2010/0218108 A1* | 8/2010 | Crabtree | ................ | G06Q 50/06 715/738 |
| 2010/0332373 A1* | 12/2010 | Crabtree | ................ | G06Q 40/04 705/37 |
| 2012/0101639 A1* | 4/2012 | Carralero | ................ | G06F 1/26 700/286 |
| 2012/0197450 A1 | 8/2012 | Krok et al. | | |
| 2013/0041516 A1* | 2/2013 | Rockenfeller | ............ | H02J 3/38 700/287 |
| 2013/0079943 A1* | 3/2013 | Darden, II | ............ | G06Q 50/06 700/297 |
| 2014/0018969 A1* | 1/2014 | Forbes, Jr. | .......... | H02J 13/0013 700/295 |
| 2014/0114844 A1* | 4/2014 | Forbes, Jr. | ............ | G05D 17/00 705/39 |
| 2014/0163759 A1* | 6/2014 | Anderson | ............ | G06Q 50/06 700/291 |
| 2015/0039145 A1* | 2/2015 | Yang | ...................... | G05B 13/02 700/291 |
| 2015/0312216 A1* | 10/2015 | Mohan | ................ | H04L 63/0209 726/11 |
| 2016/0043549 A1* | 2/2016 | Beauregard | ............ | G05B 13/04 700/286 |
| 2016/0301710 A1* | 10/2016 | Hason | ................... | G06F 21/566 |

OTHER PUBLICATIONS

Sandia Report, "Microgrid Cyber Security Reference Architecture"—Cynthi K. Veitch, Jordan M. Henry, Bryan T. Richardson, Derek H. Hart (Year: 2013).*

Veitch, et al. "Sandia Report, Microgrid Cyber Security Reference Architecture Version 1.0", http://prod.sandia.gov/techlib/access-control.cgi/2013/135472.pdf, Jul. 1, 2013, 87 pp.

Teklemariam Tsegay Tesfay et al: "Cyber-Secure Communication Architecture for Active Power Distribution Networks", Applied Computing, Mar. 24, 2014, pp. 545-552.

Cheung, et al. "Two-Level Network Architecture for Open-Access Power Systems with Distributed Generations", Power and Energy Society General Meeting—Conversion and Delivery of Electrical Energy in the 21st Century, 2008 IEEE, Jul. 20, 2008, 7 pp.

Extended Search Report from related European Patent Application 15165486 dated Nov. 30, 2015, 9 pp.

* cited by examiner

SYSTEM AND METHOD OF ARCHITECTURAL SECURITY AND RESILIENCE FOR MICROGRID SYSTEMS

TECHNICAL FIELD

The present disclosure relates to methods, devices, systems, and computer-readable media for providing a cyber-security architecture for microgrid systems.

BACKGROUND

Microgrids enable aggregation of various types of generating and non-generating sources as a unified control unit. Microgrid control networks are connected to various external networks for a variety of reasons, for example Supervisory Control and Data Acquisition (SCADA) networks for demand-response applications and enterprise networks or the Internet for remote monitoring and control.

These external connections expose the microgrid to threats from remote adversaries, especially cyber attackers. This becomes especially concerning for installations in sensitive sites like military bases, where military missions depend on critical infrastructure, like microgrids, for their success.

One of the challenges in protecting microgrids is that the control networks require very low latencies. Using cryptographic protection that adds additional latency in communications may not be acceptable, for example, in real-time control for synchronization and/or stability.

Also, a complex network at the microgrid site with interconnected control and SCADA networks may make the process of acquiring security certifications like the DIACAP (Defense Information Assurance Certification & Accreditation Process) much harder. To address these issues, the present disclosure presents a cyber-security architecture that can provide a secure network of assured power enclaves (also called SNAPE) that is based on a unique cyber-security strategy that, in some embodiments, segregates communication networks needed for fast, real-time control for synchronization and stability from those used for external control signals and monitoring. This segregation can thereby reduce the "attack surface" for the microgrid control network drastically.

This segregation isolates the control networks such that they can, for example, use lightweight cryptography to, for instance, meet the low latency requirements. The new approach can reduce or minimize the cyber certification burden, for example, by reducing the certification scope to only a subset of the entire network.

DETAILED DESCRIPTION

Microgrids are a collection of distributed energy resources (DERs), storage, and loads under common coordination and control to provide a single functional interface to enable its management as a single unit. A microgrid can be defined as a group of interconnected loads and distributed energy resources within clearly defined electrical boundaries that acts as a single controllable entity with respect to the grid. A microgrid can connect and disconnect from a larger grid structure (the grid or main grid) to enable it to operate in both grid-connected or island-mode (separated from the grid).

As such, microgrids can act as a single point of integration for generating (renewable and/or non-renewable) and non-generating sources. Microgrids accumulate all the generation capacity at a site and providers power to the local site not only in cases of blackouts but also in ancillary capacity to lower energy usage from the main grid.

Microgrids are deployed in various types of organizations like military bases, hospitals, universities, residential communities, and government buildings for energy efficiency and security. Microgrids offer various types of deployments like a single microgrid providing power to a site, multiple microgrids functioning in isolation at a site, or multiple microgrids deployed as power enclaves where each enclave is served by a single microgrid unit but all these units are connected via electrical power lines for load balancing and communication lines for common control and coordination.

In industrial control systems, operations sites are often distributed and multiple sites are connected with a common control center. Also, the control center needs to communicate with the enterprise network. To enable all the communications, microgrids and/or control centers are often connected to the Internet either directly or via a control center used to control the microgrid.

Typically, the control center to microgrid communications use Distributed Controls System (DCS) protocols like DNP3, Modbus, etc. or, for longer distances, IP based protocols or other suitable communication types can be used, for example. These include DCS IP protocols or TCP/IP protocol.

With connection to the Internet, the microgrids are exposed to various cyber threats. Cyber attackers could potentially target a microgrid and attempt to disrupt site operations by launching cyber-attacks. Targeting microgrids would become more lucrative to attackers if they are installed on sensitive sites like military bases, hospitals, or sensitive government buildings.

In the present disclosure, a cyber-security architecture is proposed that maintains network separation in microgrid communications to reduce the attack surface while improving the communications and security efficiency. The architecture embodiments discussed herein are based on a unique cyber-security strategy that segregates communication networks needed for fast, real-time control for synchronization and/or stability from those used for external control signals and monitoring thereby potentially reducing the "attack surface" for the microgrid control network drastically.

The architecture embodiments discussed herein could be utilized by a military base where multiple power enclaves with secure communications can be envisioned. As such, a microgrid system deployed based on the architecture embodiments discussed herein could provide energy security and/or efficiency to the military base, thereby contributing to the energy security and/or net-zero goals of the government, for example. Details of the proposed architecture are presented below.

Additionally, embodiments of the present disclosure can provide the following benefits:

1) Developing a cyber-security architecture for microgrids with a unique cryptographic network separation strategy that reduces or minimizes latency in a control network and/or can also reduce or minimize the "control network attack surface".
2) Develop a unique deployment architecture for microgrids for security and scalability.
3) Reduce the certification burden and/or time for microgrid deployment by reducing the scope for certification.

In the current DCS or SCADA environment, typically the International Electrotechnical Commission's (IEC)—IEC 61850 architecture for electric power systems is used for communications between power sub-stations. It can also be used for connecting power enclaves defined in the architecture embodiments of the present disclosure where multiple microgrids coordinate command and control. This environment typically has a very strict time frame for command-response messages and any additional latency is undesirable, as it adversely impacts system performance in terms of established requirements.

As presented above, as microgrid systems are being connected to external networks like enterprise networks and the Internet, the threat to these systems increases, significantly. Cyber attackers can attack microgrid power enclaves and compromise critical operations, for example, by exploiting vulnerabilities at the network, system, and/or applications level.

Also, some microgrid deployments are planned with network and IT security that are not standards compliant. Many systems rely on perimeter protection while the internal systems were designed with lower security, intended to be part of a closed network. As such, achieving defense-in-depth in these microgrid systems or networks can be challenging.

Another related problem in power networks is that communication protocols like IEC 61850 were not designed for security and they do not support security features, inherently. As such, providing communications security using these protocols may require a lot of ad-hoc and ancillary security mechanisms.

These ad-hoc and ancillary security mechanisms can inadvertently introduce security vulnerabilities in the system, which cyber attackers can exploit. Standards like IEC 62351 aim to secure IEC 61850 based communications, but even IEC 62351 does not cover the entire gamut of security vulnerabilities in networked microgrid deployments.

Object Linking and Embedding (OLE) for Process Control Unified Architecture (OPC UA) presents a framework that provides a standards-based communication backbone with inbuilt security that covers a larger set of cyber-security threats but it still does not address microgrid specific threats like exposure of sensitive control networks, integration of legacy components, and complexities in achieving cyber-security certifications. These issues will be elaborated upon in detail later in this disclosure.

The remainder of this section is focused on the three problems that are discussed above. First, the internal networks in the deployment architecture can include several sub-networks like the SCADA network, microgrid control network, connections to enterprise network, etc. Since all these networks are interconnected, it increases the exposure of microgrid control networks. An attacker can, for example, exploit an attack vector (a path or a software tool that an attacker uses to attack the target) to break into any of the sub-networks and they can try to disrupt operations in the microgrid control networks.

Second, for microgrid installations on defense networks the deployment should achieve U.S. Department of Defense Information Assurance Certification and Accreditation Process (DIACAP) (or more recently DIARMF) certification. Since the deployment network includes several sub-networks, the task of security assessment and certification for the microgrid control networks can become very complex and challenging.

In the following portion of the detailed description, reference is made to the accompanying figures that form a part hereof. The figures show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense. Also, as used herein, "a" or "a number of" something can refer to one or more such things. For example, "a number of operations" can refer to one or more operations.

Figure 1:
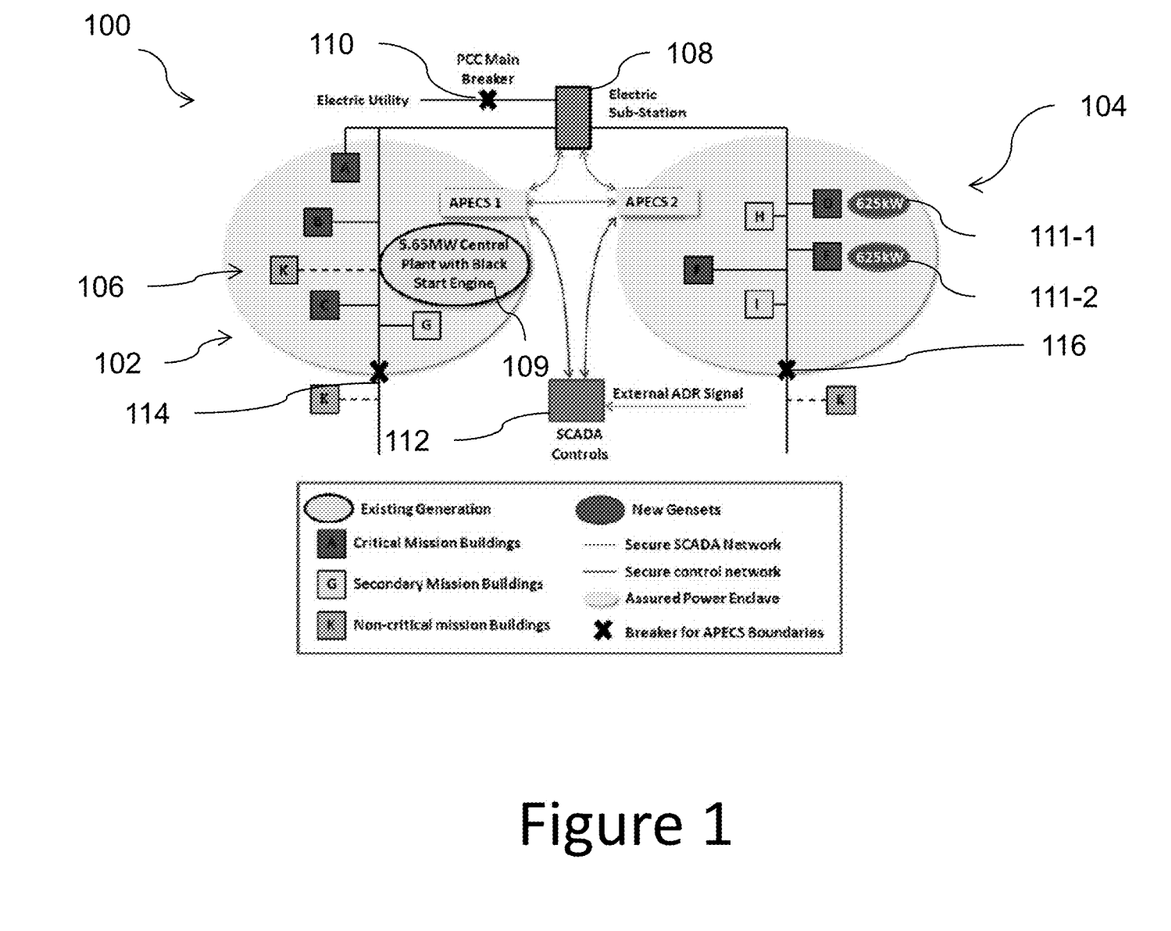
FIG. 1 illustrates an example of a cyber-security architecture for microgrids according to one or more embodiments of the present disclosure.

The architecture embodiments of the present disclosure enable secure communications and controls among multiple microgrid systems at a site, where each of the microgrids creates a power enclave. FIG. 1 illustrates an example of a cyber-security architecture for microgrids according to one or more embodiments of the present disclosure.

FIG. 1 illustrates a system 100 having two power enclaves APECS1 102 and APECS2 104. Each power enclave has critical mission buildings (e.g., buildings A, B, C, and G in enclave 102 and buildings D, E, F, H, and I in enclave 104) and non-critical mission buildings (e.g., buildings K in both enclaves) attached to it. They may also, for example, have one or more generators powering it (e.g., generator 109 in enclave 102 and generators 111-1 and 111-2 in enclave 104).

The microgrid has a PCC main breaker 110 that can disconnect the microgrid from the main grid to bring it to islanding mode. The lines connecting the substation 108 to APECS1 102 and APECS2 104 represent a secure control network, whereas the lines connecting the SCADA controls 112 to APECS1 102 and APECS2 104 represent a secure SCADA network. In such an embodiment, the SCADA network and the control network are isolated from each other. This isolation can be either physical or logical as explained herein.

The embodiments of the present disclosure can function in grid connected mode, as well as islanding mode, to provide power to the local site. In various embodiments, the SCADA controls of an embodiment of the present disclosure can accept external automated demand response (ADR) signals and participate in ADR programs for energy efficiency.

B. Security Properties in the Architecture Embodiments of the Present Disclosure.

The architecture embodiments of the present disclosure can provide a number of security properties to address cyber-security concerns presented herein. Examples of security properties are listed below:

1) Confidentiality of information, command/response, and power system operations
2) Integrity of data and communications flowing in and out of the microgrid
3) Availability of communication channels and microgrids to participate in command/response communications
4) Authenticity of the information source
5) Protection and isolation from the enterprise and external networks
6) Message level integrity protection in addition to channel protection
7) Auditing and forensic analysis ability
8) Reducing the cyber-attack surface
9) Application integrity protection This section presents the architectural details of the system and describes its functioning through some use cases. Also described is how the system imbibes the security properties described above.

As depicted in FIG. 1, the secure control network (between the sub-station 108 and enclaves 102 and 104) is isolated from the secure SCADA network (between the SCADA controls 112 and the enclaves 102 and 104). This provides isolation of the control network from the possible access from an enterprise network, for example, connected to the SCADA network and other external networks including the Internet.

This isolation improves the response time on the control network that is critical for synchronizing among the microgrids because the control network hardware does not have to process instructions taking place on the SCADA network. It also reduces the attack surface (number of places from which the network can be attack) on the control network as there is no direct communication path.

In the architecture illustrated in FIG. 1, OPC UA can, for example, be utilized for implementing the communication backbone. OPC UA is backward compatible with DCS protocols like IEC 61850, which are used for messaging, so its usage may be beneficial.

OPC UA provides authentication and authorization services at the application layer. Details of these services are provided herein.

Availability in the network can be provided by multiple separate mechanisms. For example, isolation of the control network from external networks ensures that the control network communication can meet low latency requirements and/or critical infrastructure components are not unavailable due to large latencies or disruptions caused by microgrid components being out of sync. Further, cryptographic protection of messages and network, as well as network firewalls can be being used to ensure that attackers cannot compromise the network or launch Denial of Service (DoS) attacks against the network's components.

Finally, important events, access, and/or messages can be logged into the microgrid systems to enable auditing and forensic analysis. This, for example, helps in identifying anomalous behavior and/or also to perform root cause analysis, if an attack on the system is suspected. This can be accomplished by a computing device such as that illustrated in FIG. 3, as will be described in more detail below.

The OPC UA integration with the architecture embodiments of the present disclosure to provide a secure communication backbone to the system is described below. Herein the disclosure presents the OPC UA security model and some of its details to illustrate how the architecture embodiments can provide some of the security properties described above.

Figure 2:
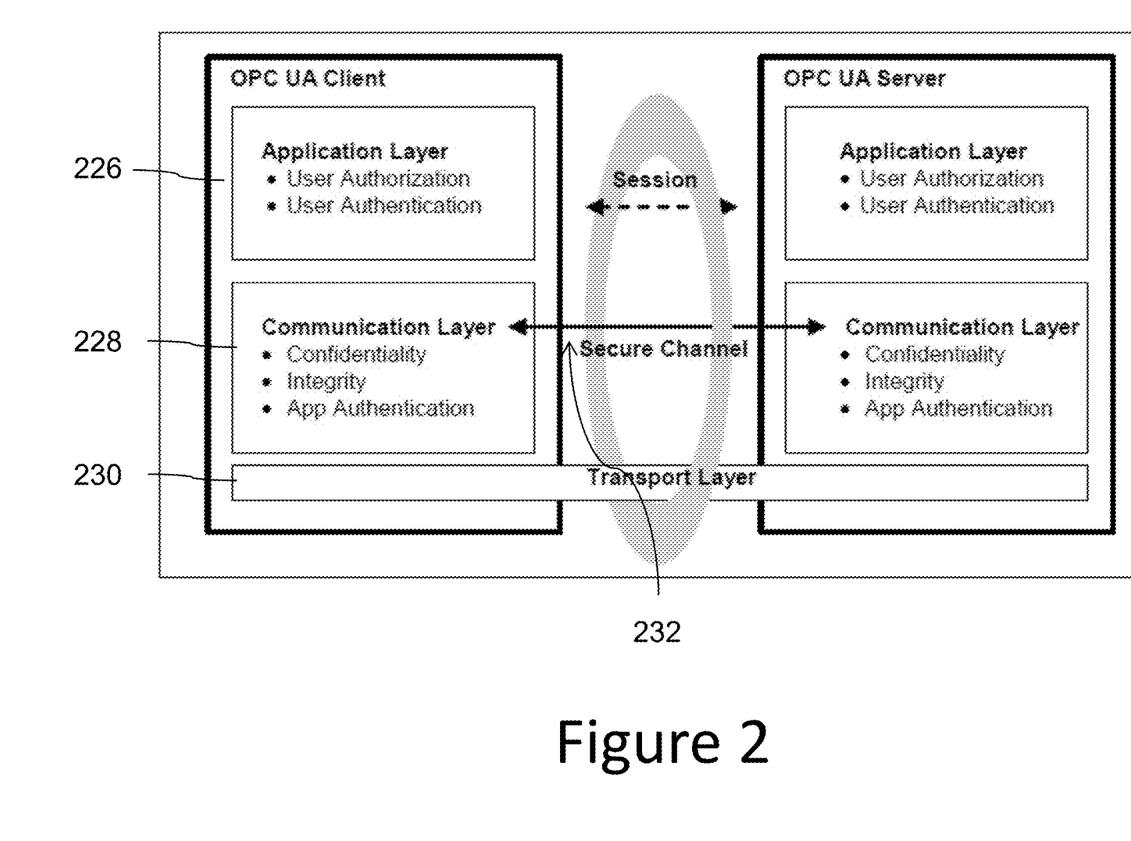
FIG. 2 illustrates an example of how the functionalities of the system can be divided onto different layers according to one or more embodiments of the present disclosure.

FIG. 2 illustrates an example of how the functionalities of the system can be divided onto different layers according to one or more embodiments of the present disclosure. OPC UA is a standard that is published by the OPC foundation. It is an improvement of the previous standard called OPC classic.

OPC UA builds upon OPC classic with several significant updates including an open platform architecture, built-in security model, and feature-rich data modeling. It is also backward compatible with standards like IEC-61850.

This makes OPC UA a suitable choice for integrating with the SNAPE architecture. The OPC UA security model is shown in FIG. 2.

The model has three layers, the communication layer 228, the application layer 226, and the transport layer 230. In the communication layer 228, a secure channel 232 is established for providing confidentiality and integrity to the communications between a client (e.g., microgrid device) and a server (e.g., SCADA control device).

Another feature that is supported is application authentication to allow only an authenticated application to participate in microgrid operations. In the application layer, user authentication and authorization is provided to establish a secure session over a secure channel.

One point to note here is that availability itself is not provided by the OPC UA security model. It relies on minimum processing of messages prior to authentication and defers availability property to server implementation. The architecture embodiments of the present disclosure complement these by providing strong availability properties by features like network segmentation, cryptographic separation, and network firewalls, in various embodiments.

OPC UA security model is comprehensive and offers multiple options for achieving the security properties in the communication and application layers. In the application layer, authentication can be achieved by several different means (e.g., username/password, an X.509v3 certificate, or a WS-SecurityToken). An International Telecommunication Union—X.509v3 certificate involves multiple asymmetric cryptographic operations that are computation intensive and may not be the most suitable for each authentication, for example, on resource constrained environments, but may be suitable in some applications.

Username/passwords and WS security tokens are examples of technologies that can provide comparatively efficient authentication in the microgrid system. During system implementation, a comparison could be made between the different mechanisms with the real time requirements of the system and a selection of the most efficient form of authentication for the architecture embodiments of the present disclosure could be made.

Authorization in the OPC UA security model is more open ended and can integrate already deployed authorization solutions. Since the architecture embodiments of the present disclosure are targeting microgrids, existing authorization mechanisms in the form of Access Control Lists (ACLs) can be integrated. This would provide fine grained authorization on microgrid system resources using existing mechanisms, in some embodiments.

In the communication layer, confidentiality can be provided by encryption in the secure channel, message signatures for message integrity, and/or digital signatures for application authentication. Like the application layer, the OPC UA stack provides multiple options to implement each security mechanism.

In various embodiments, the optimal combination of asymmetric and symmetric cryptographic algorithms in the architecture embodiments of the present disclosure can be selected to meet the performance requirements of the system. OPC UA is flexible and allows deployments to select any combination of these mechanisms to suit specific deployment environments.

To illustrate, a combination of mechanisms like Transport Layer Security (TLS) for channel protection and symmetric algorithms for message integrity will suit the microgrid deployment environment. This would allow embodiments of the present disclosure to leverage the benefit of TLS for channel protection and the advantage of symmetric algorithms like AES256 and HMAC (SHA1) for improved real time performance for message integrity protection. Provided in the next section is a short description of a computing device that could be used as a microgrid security device either in an enclave or in the sub-station or SCADA controller (e.g., device 112), in the embodiments of the present disclosure.

Figure 3:
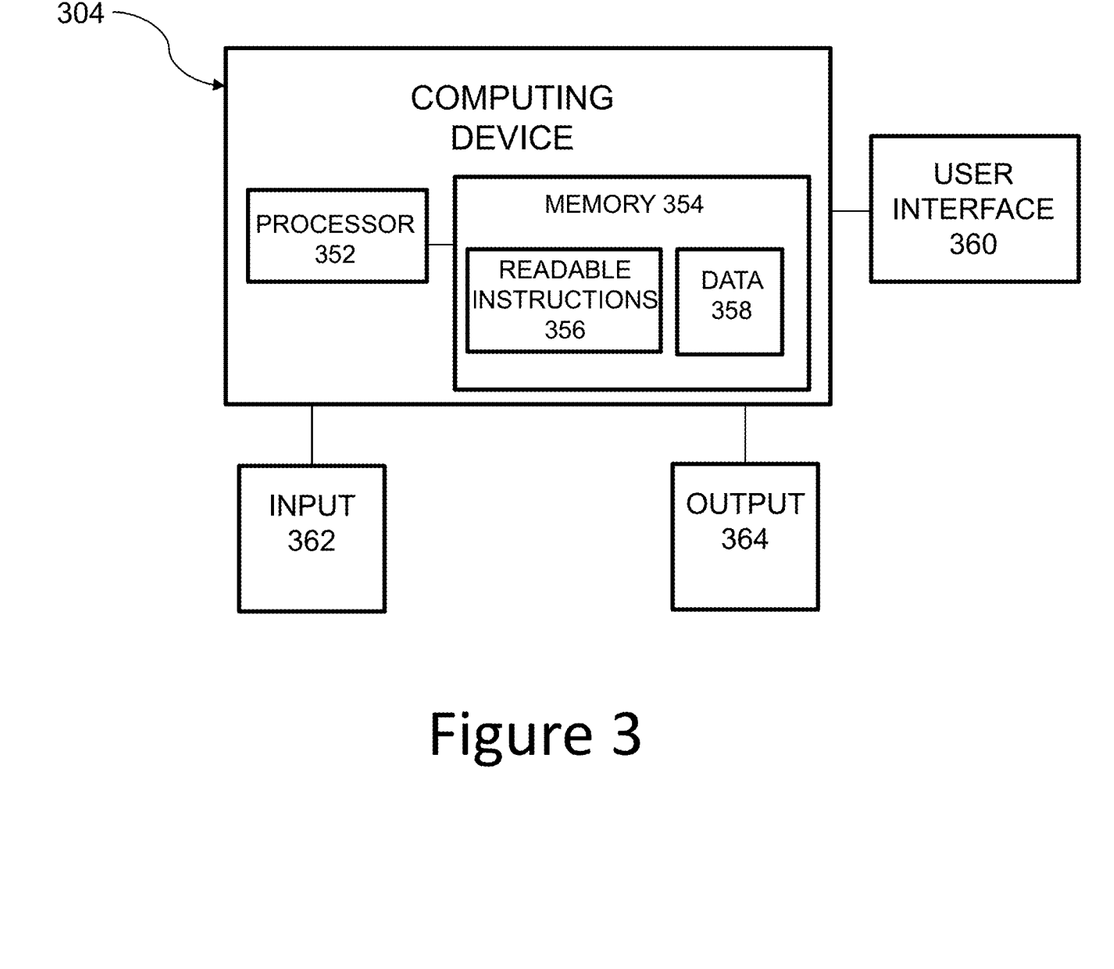
FIG. 3 illustrates an example of a computing device that can be utilized in the system according to one or more embodiments of the present disclosure.

FIG. 3 illustrates a computing device that can be utilized according to one or more embodiments of the present disclosure. For instance, a computing device 304 can have a number of components coupled thereto. The computing device 304 can include a processor 352 and a memory 354. The memory 354 can have various types of information including data 358 and executable instructions 356, as discussed herein.

The processor 352 can execute instructions 356 that are stored on an internal or external non-transitory computer device readable medium (CRM). A non-transitory CRM, as used herein, can include volatile and/or non-volatile memory. Volatile memory can include memory that depends upon power to store information, such as various types of dynamic random access memory (DRAM), among others. Non-volatile memory can include memory that does not depend upon power to store information.

Memory 354 and/or the processor 352 may be located on the computing device 304 or off of the computing device 304, in some embodiments. As such, as illustrated in the embodiment of FIG. 3, the computing device 304 can include a network interface having input and/or output capabilities (e.g., input 362 and output 364 connections). Such an interface can allow for processing on another networked computing device and/or can be used to obtain data and/or executable instructions for use with various embodiments provided herein.

When used as a SCADA control device, the device 304 can utilize inputs and outputs (e.g., 362 and 364) to communicate with other networks, such as an enterprise network (e.g., having other military base or power generation functionalities) and/or the Internet or other local area or wide area networks. The isolation between the control and SCADA networks in such embodiments provides further protection against attacks from attackers accessing the control network via the other networks connected to the SCADA network and reduces the attack surface of the control network.

As illustrated in the embodiment of FIG. 3, the computing device 304 can include a user interface 360 that allows a user to review instructions and/or data on the device 304. Such an interface can be used to review access privileges to be given to a device, review instructions to be sent to a device, and/or data available on the device 304 or provided by another device, among other functions.

In the section below, the discussion will identify different potential cyber threats that exist in the microgrid deployment scenario as illustrated in FIGS. 1 and 2 and analyze how the architecture embodiments of the present disclosure can be utilized to mitigate those cyber threats.

Remote Sabotage:

Threat: An adversary can remotely access the microgrid and launch elevation of privilege to gain privileged rights on the microgrid system. It can then perform unauthorized operations to sabotage microgrid operations to disrupt critical infrastructure functionality.

Mitigation: embodiments of the present disclosure can implement a number of security controls to mitigate this threat. Network communication is secure which prevents from threats like session hijacking. Identity management with strong account management can be implemented to prevent account spoofing attacks; and embodiments of the present disclosure can implement access control on the microgrid system to prevent unauthorized access to resources and operations in the microgrids.

Tampering with Power Enclave Synchronization:

Threat: The adversary can try to disrupt the synchronization among the power enclaves by reporting wrong power measurements to other entities. This could potentially destabilize the power enclaves and disrupt their operations.

Mitigation: The control network and the SCADA network are isolated from each other. This isolation reduces the attack surface from the SCADA network to the energy network (control network), drastically. Moreover, authentication and access control protections on the microgrids prevent unauthorized access. As such, the case that an adversary could reach the control network and disrupt its operations is highly unlikely.

Sensitive Information Disclosure:

Threat: An attacker can view sensitive information in the microgrid system which is either at rest on the system or is in transit during its exchange in the system.

Mitigation: The architecture embodiments of the present disclosure implement authentication and access control on the microgrid systems, so that only authorized entities in the system can view sensitive data. Additionally, information during transit is protected by using strong network security by encrypting the communication channels using TLS. These controls protect sensitive information at rest or in transit from unauthorized disclosure.

Denial of Service (DoS): Threat:

An attacker can launch a denial of service attack on the microgrid system by network flooding to make it unavailable for power system operations.

Mitigation: The embodiments of the present disclosure use secure network topologies derived from standards like NIST SP 800-53, IEC 62443, etc. to deploy firewalls and De-Militarized Zones (DMZs) to isolate the SCADA and control networks from the enterprise network. Firewalls can provide front line protection against network flooding attacks to counter against DoS type attacks in conjunction with the other techniques described with respect to the embodiments of the present disclosure. For example, the SCADA and control networks are isolated which further reduces the attack surface on the control network. Additionally, the OPC UA communication backbone identifies unauthenticated messages and performs minimal processing of the unauthenticated messages to mitigate the threat of those messages creating a DoS issue.

Malware Installation:

Threat: An attacker can install malware on the microgrid devices by various attacks like modifying the device firmware, or installing malware on the system.

Mitigation: Embodiments of the present disclosure can provide multiple types of protection against this type of attack. For example, installing software or firmware on the device is a privileged action that only an administrator can perform. This would require an attacker to compromise the highly secure administrator accounts.

In another example, integrity checks on the firmware or software are performed by validating the digital signatures on the firmware or software. Only firmware or software that passes the validity check is allowed to be installed on the microgrid system. These mechanisms protect against installing malware on the microgrid.

The section below, discusses some architectural tradeoffs in the context of the architecture embodiments of the present disclosure. Whenever security considerations are included in architectures, there are inevitably some tradeoffs that the architecture designer has to make to balance security versus performance, cost, development time, and/or usability. Since the architecture embodiments of the present disclosure can be designed for sensitive microgrid installations, this discussion is presented in that context.

In embodiments of the present disclosure use of TLS in the network for strong network protection can be utilized. It also provides end device authentication and is especially useful for sensitive installations. It also helps in achieving compliance with frameworks like DIACAP or Department of Defense Information Assurance Risk Management Framework (DIARMF).

One downside of using TLS is that Public Key Infrastructure (PKI) certificates are to be installed and managed on the network. Using symmetric encryption is possible with TLS but that is a non-standard mode of operation not preferred for regular deployments.

The final tradeoff that is presented here is related to integrating OPC UA into embodiments of the present disclosure. Integration of OPC UA increases complexity and cost of system development. One benefit is that it increases communication security by using standards based security. It also provides a versatile and feature rich communication backbone for embodiments of the present disclosure.

One prior concept for microgrid cyber-security was based on a distributed control approach that uses IPv6 protocol for communications. Use of IPv6 provides some benefits like making host scanning harder and identification from outside the network because of large number of possible IP addresses, end-to-end encryption, and more secure name resolution that helps in countering attacks like ARP poisoning.

In embodiments of the present disclosure, architectural risk analysis can be performed, for example, using threat modeling and included security controls and mechanisms to address them and provide higher security. Embodiments of the present disclosure provide all the above mentioned benefits that are provided by an IPv6 based network, and other benefits.

The deployment of the IPv6 technique is on a private network with strong perimeter protection. The secure firewalls disable network scanning and identification. In the embodiments of the present disclosure end-to-end encryption can be provided, for example, using TLS.

First, decentralized peer-to-peer control architectures in the IPv6 technique would mean that each of the nodes is equally trusted and can even take over the functionality of other nodes which is typically supported for automatic recovery. In addition to adding complexity in the system this approach potentially opens new attack vectors in the system. The adversary can now compromise any one node and try to sabotage the system.

In centralized model of the IPv6 technique, the server has much higher security than the client nodes. Maintaining trust in open decentralized peer-to-peer models is a hard problem and even controlled system deployments would inherit some of its threats if they are connected to the Internet.

Second, since the control and coordination is distributed to every node, it is not possible using the IPv6 technique to segment the network and isolate them for higher security and performance; something that is inherently supported and demonstrated in the embodiments of the present disclosure.

Additionally, deploying IPv6 based networks potentially opens a number of security holes in deployments. If IPv6 and IPv4 are being run simultaneously, then IPv6 should be either tunneled over IPv4 or run independently.

In tunneling mode, the configuration issues can create security holes in the system. If both the protocols are run in parallel, firewalls have to be configured to filter IPv6 traffic, which is not very common.

Normal firewalls can leave IPv6 traffic unfiltered, which can let the adversary use that as an insecure channel to enter the system. Also, IT administrators must learn new ways to deploy, configure, and monitor networks under the IPv6 technique.

Some other issues in IPv6 technique deployments include network trouble shooting, configuring firewalls, monitoring security logs, and secure configurations. Further, security operations center analysts must learn and apply new features in real time analysis, and network audit must be adapted to new security features. Most of the IPS/IDS tools do not effectively analyze and identify security vulnerabilities and attacks in IPv6 traffic leaving attack detection harder.

In the following several embodiments of the present disclosure are discussed. For example, in one embodiment, a system for providing a cyber-security architecture for a microgrid includes a supervisory control and data acquisition network device (a communication network device (e.g., 112) having at least one remote network connection (e.g., external ADR signal is communicated via such a network in FIG. 1 from a non-local network device, either on the supervisory control and data acquisition network or on another network that is not the control network) to a non-local network device and allowing communication of data and control instructions between the non-local network device and at least one local device in a microgrid network. The system also includes a control network (e.g., between sub-station 108 or another suitable location and the local devices within enclave 102 and/or enclave 104) for providing control instructions to the local device based on data from the microgrid and a power generation network device, the control network allowing communication of data and control instructions between the power generation network device and the local device in the microgrid network.

In some embodiments, the microgrid network includes multiple power generation enclaves and each enclave has a local device in independent communication with the power generation network device. In this manner, the microgrid can be broken into smaller areas that can be advantageous in managing power consumption by the microgrid devices and the power draw by areas of the microgrid to help with energy management. Also, from a security standpoint, these enclaves can restrict access to smaller areas of the microgrid making access to a particular device more difficult and reducing the amount of access an attacker can gain by accessing one local microgrid device).

The microgrid network includes multiple power generation enclaves and each enclave has a local device that is in communication with at least one other local device of another enclave, in various embodiments. In this manner, local devices can interact across enclaves, but may not be accessible from other networks, such as the supervisory control and data acquisition network.

The microgrid network can also include a firewall established between the supervisory control and data acquisition network device and the non-local network device. In some embodiments, the microgrid network can further include a local area network between the supervisory control and data acquisition network device and the local device.

The microgrid network can further include a local area network between the power generation network device and the local device. The microgrid network can include at least one control mechanism in communication with the local device wherein the at least one control mechanism actuates to provide power to equipment within a building.

In some system embodiments, the system for providing a cyber-security architecture for a microgrid includes a supervisory control and data acquisition network device having at least one remote network connection to a non-local network device and allowing communication of data and control instructions between the non-local network device and at least one local device in a microgrid network. The system can also include a control network for providing control instructions to the local device based on data from the microgrid and a power generation network device, the control network allowing communication of data and control instructions between the power generation network device and the local device in the microgrid network that is independent from the communication between the non-local device and the at least one local device.

In some embodiments, the power generation network device is located at a power generation sub-station. In some embodiments, the control network can be administered from a local device (e.g., located within one of the enclaves 102 or 104 or at the sub-station 108, among other suitable locations).

The system can include a breaker between the power generation network device and a power source. This can allow the power to the entire set of enclaves to be interrupted if it is necessary to do so.

The microgrid network can include devices having different levels of criticality and power delivery to these devices is based on a hierarchy of the different levels and which level is quantified as the highest in the hierarchy. In some such embodiments, the hierarchy levels include critical, secondary, and non-critical. In this manner, power demands can be directed to items having the greatest need based on hierarchy and security can be heightened based on the hierarchy (e.g., devices classified as critical can have a higher level of security (less people can access them or the amount of authentication may be higher) than devices classified as secondary or non-critical.

The present disclosure presents an architecture for secure deployment of microgrids. Microgrids can be part of critical infrastructure for energy and are being deployed on military bases and elsewhere, for example, as a means to reduce dependency on the power grid, to account for power security during outages, and/or to achieve the net-zero goals. This disclosure presents various cyber-security threats that could potentially impact these microgrids as they are connected to external networks including the Internet and solutions to those threats.

The disclosure presents security problems that are inherited by connection to vulnerable SCADA networks and to get certification for these microgrid networks for operations, for example, on military bases.

To address these issues the present disclosure describes various embodiments, which can provide a cyber-security architecture for secure deployment of microgrids. The architecture embodiments of the present disclosure introduce several unique concepts like physical separation of the microgrid control network from the SCADA network and standards based security controls for microgrid network protection.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A system for providing a cyber-security architecture for a microgrid, having multiple power generation enclaves, wherein each of the multiple power generation enclaves includes a power generator, the system comprising:

a supervisory control and data acquisition (SCADA) network device that includes a SCADA network, the supervisory control and data acquisition network device configured to be externally connected to each of the multiple power generation enclaves, the SCADA network being configured to have at least one remote network connection to a non-local network device and to allow encrypted communication of data and control instructions between the non-local network device and at least one local device in each of the multiple power generation enclaves in the microgrid; and a control network, separate from the SCADA network including the supervisory control and data acquisition network device, the control network configured to provide control instructions to the at least one local device in each of the multiple power generation enclaves based on data from the microgrid and a power generation network device, the control network configured to allow communication of data and the control instructions between the power generation network device and the at least one local device in each of the multiple power generation enclaves, and wherein the control network is configured to provide a connection to independently disconnect each of the multiple power generation enclaves from the power generation network device such that the power generator of a disconnected power generation enclave is configured to power the disconnected power generation enclave; and wherein the multiple power generation enclaves being connected to the supervisory control and data acquisition network device are configured to operate separately from the multiple power generation enclaves being connected to the control network.

2. The system of claim 1, wherein each power generation enclave has a local device that is in communication with at least another local device of another power generation enclave.

3. The system of claim 1, wherein the microgrid includes a firewall established between the supervisory control and data acquisition network device and the non-local network device.

4. The system of claim 1, wherein the microgrid further includes a local area network between the supervisory control and data acquisition network device and the at least one local device in each of the multiple power generation enclaves.

5. The system of claim 1, wherein the microgrid further includes a local area network between the power generation network device and the at least one local device in each of the multiple power generation enclaves.

6. The system of claim 1, wherein the microgrid includes at least one control mechanism in communication with the at least one local device in each of the multiple power generation enclaves, wherein the at least one control mechanism actuates to provide power to an equipment within a building.

7. The system of claim 1, wherein
the communication of data and the control instructions between the power generation network device and the at least one local device in each of the multiple power generation enclaves is independent from the encrypted communication between the non-local network device and the at least one local device in each of the multiple power generation enclaves in the SCADA network.

8. The system of claim 1, wherein the power generation network device is at a power generation sub-station.

9. The system of claim 1, wherein the system includes a breaker between the power generation network device and a power source.

10. The system of claim 1, wherein the microgrid includes devices having different levels of criticality and power delivery to these devices is based on a hierarchy of the different levels and which level is quantified as the highest in the hierarchy.

11. The system of claim 10, wherein the hierarchy of the different levels include critical, secondary, and non-critical.

12. A system for providing a cyber-security architecture for a microgrid, having multiple power generation enclaves, wherein each of the multiple power generation enclaves includes a power generator, the system comprising:
a communication network device that includes a supervisory control and data acquisition (SCADA) network, the communication network device configured to be externally connected to each of the multiple power generation enclaves, and the SCADA network being configured to have at least one remote network connection to a non-local network device and to allow encrypted communication of data and control instructions between the non-local network device and at least one local device in each of the multiple power generation enclaves in the microgrid; and a control network, separate from the SCADA network including the communication network device, the control network configured to provide control instructions to the at least one local device in each of the multiple power generation enclaves based on data from the microgrid and a power generation network device, the control network configured to allow communication of data and the control instructions between the power generation network device and the at least one local device in each of the multiple power generation enclaves that is independent from the encrypted communication between the non-local network device and the at least one local device in each of the multiple power generation enclaves in the SCADA network, wherein the control network is configured to provide a connection to independently disconnect each of the multiple power generation enclaves from the power generation network device such that the power generator of a disconnected power generation enclave is configured to power the disconnected power generation enclave; and wherein the multiple power generation enclaves being connected to the communication network device are configured to operate separately from the multiple power generation enclaves being connected to the control network.

13. The system of claim 12, wherein each power generation enclave has a local device that is in communication with at least another local device of another power generation enclave.

14. The system of claim 12, wherein the microgrid includes a firewall established between the communication network device and the non-local network device.

15. The system of claim 12, wherein the microgrid further includes a local area network between the communication network device and the at least one local device in each of the multiple power generation enclaves.

16. The system of claim 12, wherein the microgrid further includes a local area network between the power generation network device and the at least one local device.

17. The system of claim 12, wherein the microgrid includes at least one control mechanism in communication with the at least one local device in each of the multiple power generation enclaves, wherein the at least one control mechanism actuates to provide power to an equipment within a building.

18. The system of claim 12, wherein the microgrid includes devices having different levels of criticality and power delivery to these devices is based on a hierarchy of the different levels and which level is quantified as the highest in the hierarchy.

* * * * *